United States Patent [19]

Graber

[11] Patent Number: 5,098,155
[45] Date of Patent: Mar. 24, 1992

[54] COMBINATION BENCH AND BICYCLE STAND

[75] Inventor: Thomas L. Graber, Middleton, Wis.

[73] Assignee: Madrax, Inc., Middleton, Wis.

[21] Appl. No.: 589,055

[22] Filed: Sep. 27, 1990

[51] Int. Cl.⁵ .......................... A47C 7/62; A47C 31/00
[52] U.S. Cl. .................................... 297/217; 297/244; 211/20; 211/22
[58] Field of Search ............... 297/217, 112, 114, 188, 297/191, 424, 425, 244, 445, 446, 232; 211/17, 20, 21, 22, 27; 248/156, 530, 531, 532, 533

[56] References Cited

U.S. PATENT DOCUMENTS

| | | | |
|---|---|---|---|
| D. 253,142 | 10/1979 | Herman . | |
| 1,383,771 | 7/1921 | Skidmore | 297/244 |
| 2,329,088 | 9/1943 | Schram et al. . | |
| 3,907,114 | 9/1975 | Ewers . | |
| 3,994,400 | 11/1976 | Graber . | |
| 4,114,949 | 9/1978 | Benoit | 297/232 X |
| 4,306,660 | 12/1981 | Livingston | 211/20 |

FOREIGN PATENT DOCUMENTS 3238404  4/1984  Fed. Rep. of Germany ........ 211/22

OTHER PUBLICATIONS

Popular Mechanics 4/1960.

*Primary Examiner*—Kenneth J. Dorner
*Assistant Examiner*—James M. Gardner
*Attorney, Agent, or Firm*—Lathrop & Clark

[57] ABSTRACT

A combination bench and bicycle stand is disclosed which has a frame having two horizontally spaced frame members. Each frame member has a generally horizontally extending seat bearing portion spaced from the ground. The frame also has bicycle support members which define a space for receiving a bicycle and which will support a bicycle in an upright position. At least one planar member is rigidly connected and supported by the seat bearing portion, thereby providing a bench for a person seated thereon.

14 Claims, 12 Drawing Sheets

COMBINATION BENCH AND BICYCLE STAND

FIELD OF THE INVENTION

This invention relates to bicycle parking stands and benches.

BACKGROUND OF THE INVENTION

Typically benches and bicycle parking stands have been provided as separate structures for outdoor use. Bicycle stands are frequently placed near buildings which serve the public and in parks and along bicycle trails to enable bikers to stand and secure their bicycles in a fixed position and location. Outdoor benches have long been provided in outdoor locations, including parks, recreation trails and grounds near public buildings, as a convenience to the public. A structure which efficiently provides both the bicycle stand and outdoor bench functions would be advantageous to building, park and trail owners and to bicycle and pedestrian users of such facilities.

SUMMARY OF THE INVENTION

The combination bench and bicycle stand of this invention has a frame having two horizontally spaced frame members and upright bicycle support members. Each frame member has a generally horizontal seat bearing portion which is vertically spaced from the ground. The bicycle support members of the frame define a space for receiving a bicycle and are adapted to support a bicycle in an upright position. At least one planar seat member is connected rigidly between and supported by the seat bearing portions of the frame members. The article may simultaneously support seated persons and parked bicycles.

It is an object of the present invention to provide a combination bench and bicycle parking stand that utilizes less physical space than two separate structures.

Another object of the present invention is to provide a structure in which bicycles can be parked and on which a person may sit.

An additional object of the present invention is to provide a structure in which bicycles can be parked and on which a person may sit which saves materials and labor costs.

A further object of the present invention is to provide a structure in which bicycles can be parked and on which a person may sit which is a convenient seating and parking central location for pedestrians and cyclists.

A still further object of the present invention is to provide a structure in which bicycles can be parked and on which a person may sit that provides a convenient customer seating and bicycle display in a retail store.

Yet another object of the present invention is to provide a structure in which bicycles can be parked and on which a person may sit which provides aesthetic integrity between the park bench and the bicycle parking stand.

Further objects, features, and advantages of the invention will be apparent from the following detailed description taken in conjunction with the accompanying drawings.

DESCRIPTION OF THE PREFERRED EMBODIMENTS

Figure 1:
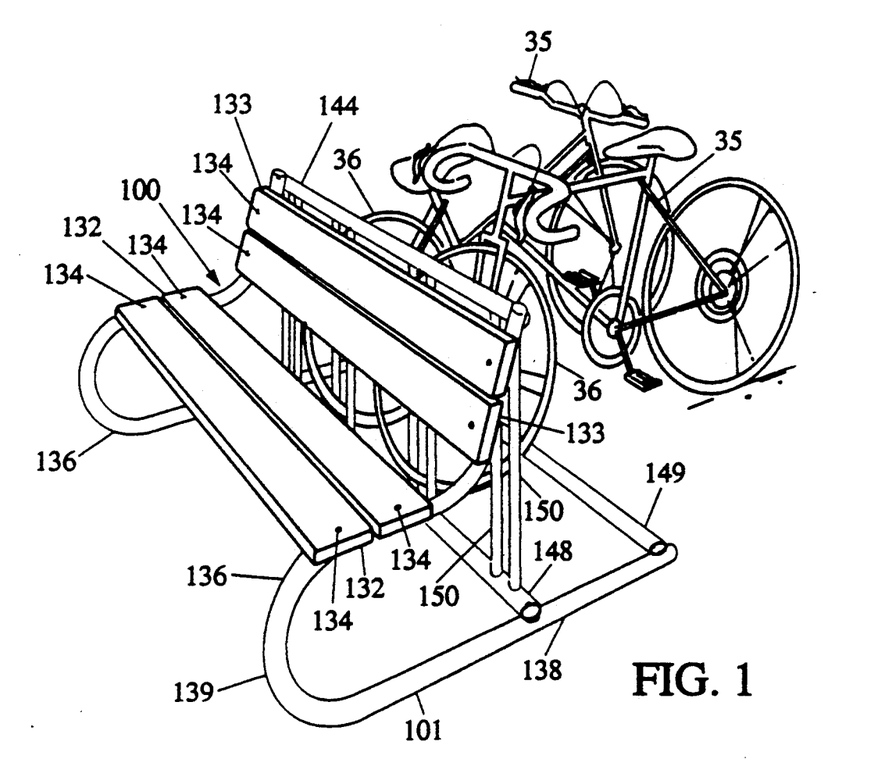
FIG. 1 is a perspective view of the bench stand of the present invention.
Figure 2:
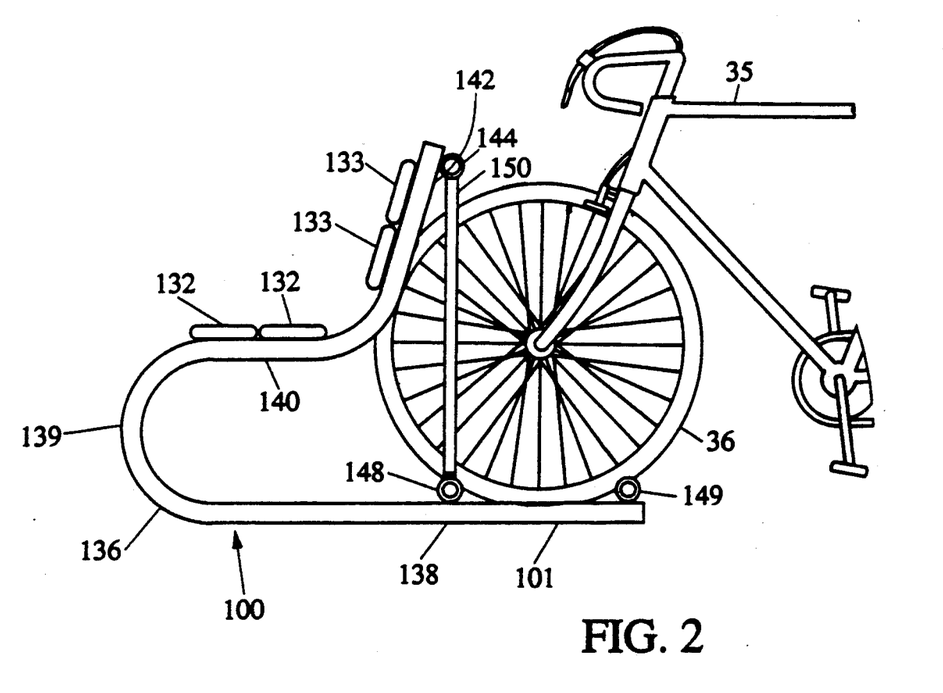
FIG. 2 is a side elevational view of the bench stand of FIG. 1.
Figure 3:
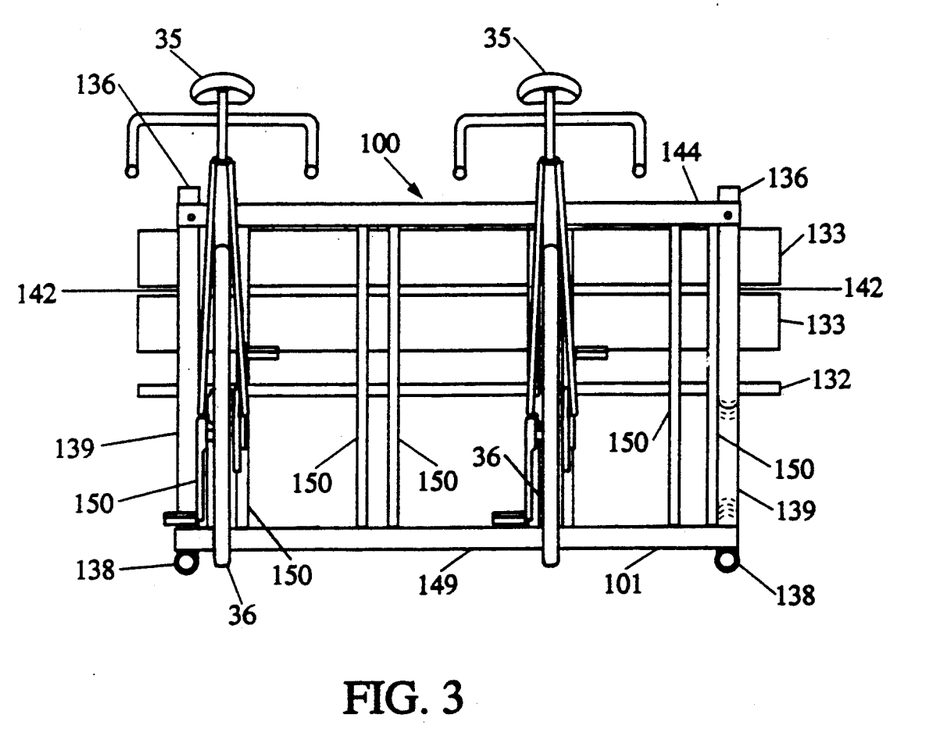
FIG. 3 is a rear elevational view of the bench stand of FIG. 1, with bicycles parked between bicycle wheel positioning members.

Referring more particularly to FIGS. 1-20, wherein like numbers refer to similar parts, a combination bench and bicycle stand or bench stand 100 is shown in FIGS. 1-3. The bench stand 100 has a frame 101 which has two frame members 136 which are horizontally spaced, an upper rod 144, a first lower rod 148, a second lower rod 149, and wheel positioning bicycle support members 150. The frame members 136 are preferably formed of bent steel tubing of circular cross section. The wheel positioning members 150 may be formed of the same tubing but are preferably formed of metal rods of much smaller diameter. Each frame member 136 is bent into a configuration which provides an extended linear base portion 138 which is horizontal and is in contact with the ground or floor. The front of the base portion 138 extends into a connecting portion 139, which is preferably U-shaped, and extends over the base portion 138 and is connected to a seat bearing portion 140 which is horizontal and spaced in generally parallel relation from the base portion. The two seat bearing portions 140 are connected by and support planar seat members or planks 132 which are thus spaced from the base portions 138 and the ground a distance which is desirable for comfortable seating. The seat members 132 provide a bench for persons seated thereon. Each frame member 136 extends upwardly and is inclined away from the seat bearing portion 140 to form a back support 142. Additional planar back members 133 are connected between the back support portions 142 of the frame members 136 to form a back support for a person seated on the seat members 132. An upper rod 144 is attached between the upper ends of the back supports 142 and behind the planks 133 which form a back support. This rod rigidly spaces the two frame members and also serves as an attachment point for wheel positioning members 150. A first lower rod 148 is affixed between the base portions 138 of the frame members 136 parallel to and directly below the upper rod 144. The first lower rod is located intermediately along the length of the base portion 138. A second lower rod 149 is attached behind the first lower rod and between the rear ends of the base portions 138.

Wheel positioning bicycle support members 150 extend between the upper rod 144 and the first lower rod 148. The spacing between wheel positioning members 150 is sufficient to accommodate a bicycle wheel tire width. The wheel positioning members 150 define a space for receiving a bicycle and are adapted to support a bicycle in an upright position. The pairs of wheel positioning members 150 are spaced at regular distances to prevent overlapping of the handlebars of bicycles parked in the bench stand 100. The second lower rod 149 prevents rearward travel of the wheel of a bicycle engaged between two wheel positioning members 150.

Although the bench stand may be produced as a kit consisting of the hardware only—leaving the end user to supply the planar members 132, 133—in the assembled bench stand the planar members 132 are fastened with fasteners 134 at each end to the approximate center of their widths to a seat bearing portion 140. The planar back members 133 are fastened with fasteners 134 to the back support 142 to provide back support for seated persons. The planar members 132, 133 may be fabricated of molded plastic or metal but are preferably wooden planks.

The frame members 136, the upper rod 144, and the lower rods 148, 149, and wheel positioning member 150 form a frame 101 which performs two functions. First it supports the planks 132, 133 which form a bench; secondly it is rigid enough to hold the wheel positioning members 150 and hold upright a number of bicycles parked behind the planks 133. Portions of the wheels 36 of the bicycles 35 are received between the bicycle wheel positioning support members 150. Because the back supports 142 incline away from the wheel positioning members, the bench stand allows compact parking of the bicycles 35, with portions of the bicycle wheels 36 located beneath the back support planks 133 which serves as a barrier between parked bicycles and a seated person.

The bench stand 100 may be bolted to pavement or it may be rested on pavement or turf.

Figure 4:
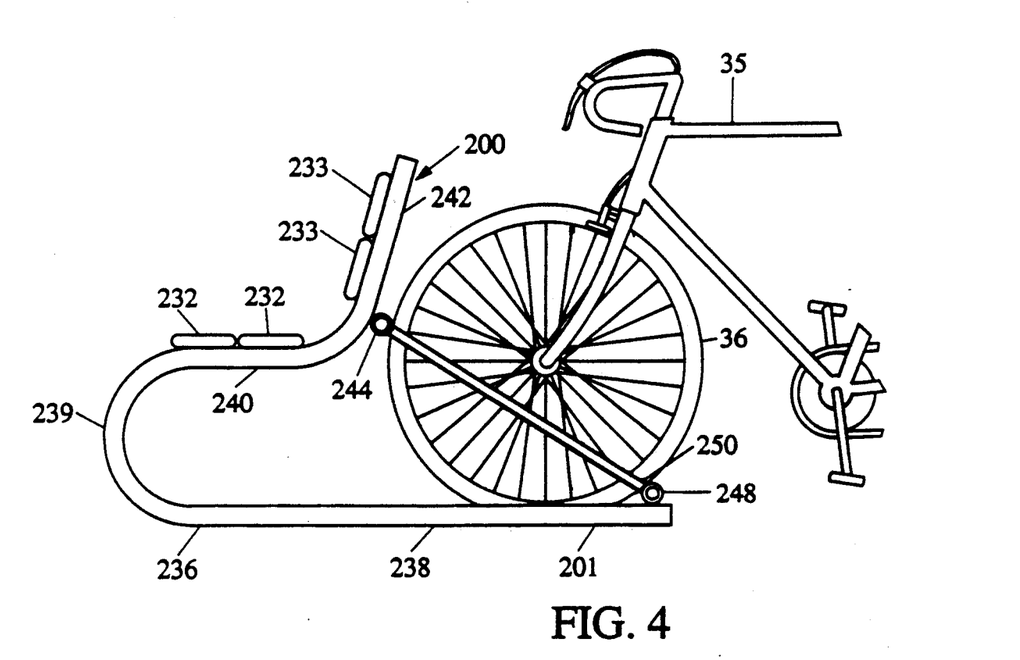
FIG. 4 is a side elevational view of a second embodiment of the bench stand of this invention.
Figure 5:
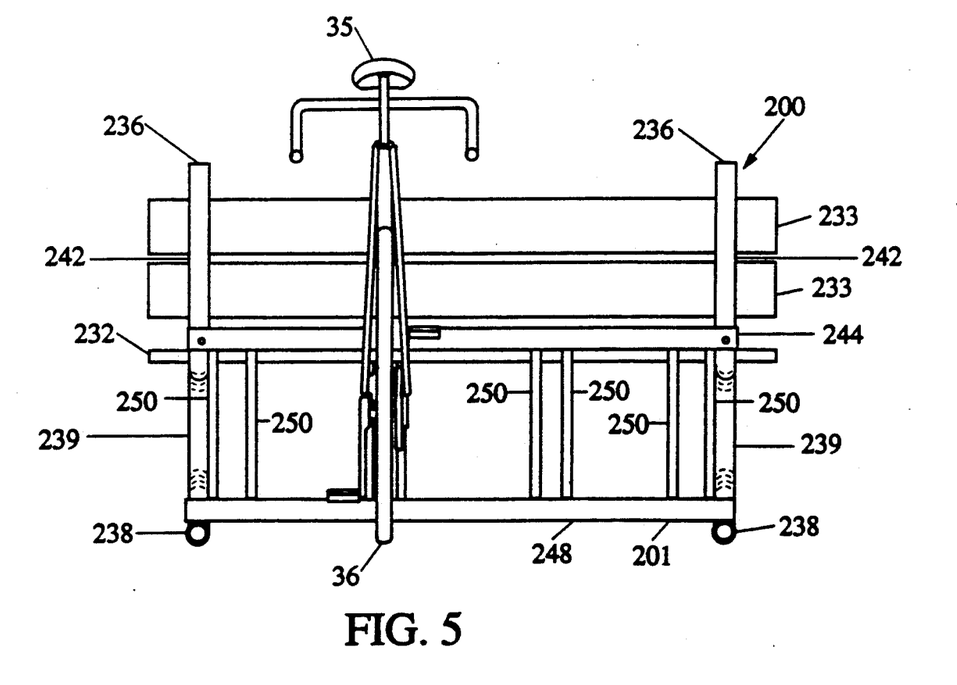
FIG. 5 is a rear elevational view of the bench stand of FIG. 4 with a bicycle positioned within vertical bicycle wheel positioning members.

A second embodiment 200 of the bench stand of the present invention is shown in FIGS. 4 and 5. The bench stand 200 has a frame 201 having two frame members 236 which are identical to the frame members 136 of the bench stand 100, a first lower rod 248, an upper rod 244, and wheel positioning bicycle support members 250.

Each frame member 236 has a base portion 238 which extends upwardly in a U-shaped connecting portion 239 to a seat bearing Portion 240 and a back support 242. The bench stand 200 has planar members 232, 233 affixed to the frame members 236 to provide seat and back support. An upper rod 244 connects the frame members 236 at a position intermediate between the back support 242 and the seat bearing portion 240. A first lower rod 248 extends between the base portions 238 and is spaced from the connecting portions 239. The base portions 238 extend horizontally rearwardly from the position of the upper rod. Pairs of wheel Positioning members 250, to hold a bicycle wheel tire, are connected between the upper rod 244 and the first lower rod 248 and are inclined outwardly from the back support to the base portion 238. The first lower rod 248 prevents the rearward travel of the bicycle wheel 36 when the bicycle wheel 36 is engaged between a pair of angled wheel positioning members 250.

Figure 6:
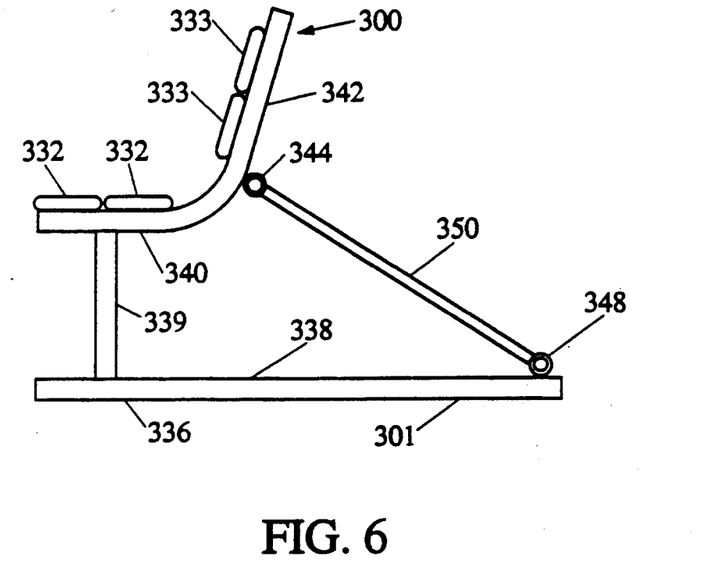
FIG. 6 is a side elevational view of a third alternative embodiment of the bench stand of the present invention.

A third embodiment 300 of the bench stand of the present invention is shown in FIG. 6. Parts corresponding to those of the second embodiment 200 are given like numbers but incremented by 100. The bench stand 300 has a frame 301, having two frame members 336, a first lower rod 348, an upper rod 344, and wheel positioning bicycle support members 350. Each frame member 336 of the bench stand 300 has a connecting portion 339 which is perpendicular to both the seat bearing portion 340 and the base portion 338 and is formed as a separate member from those portions and joins the seat bearing portion 340 and the base portion 338 at a position intermediate along their lengths.

Figure 7:
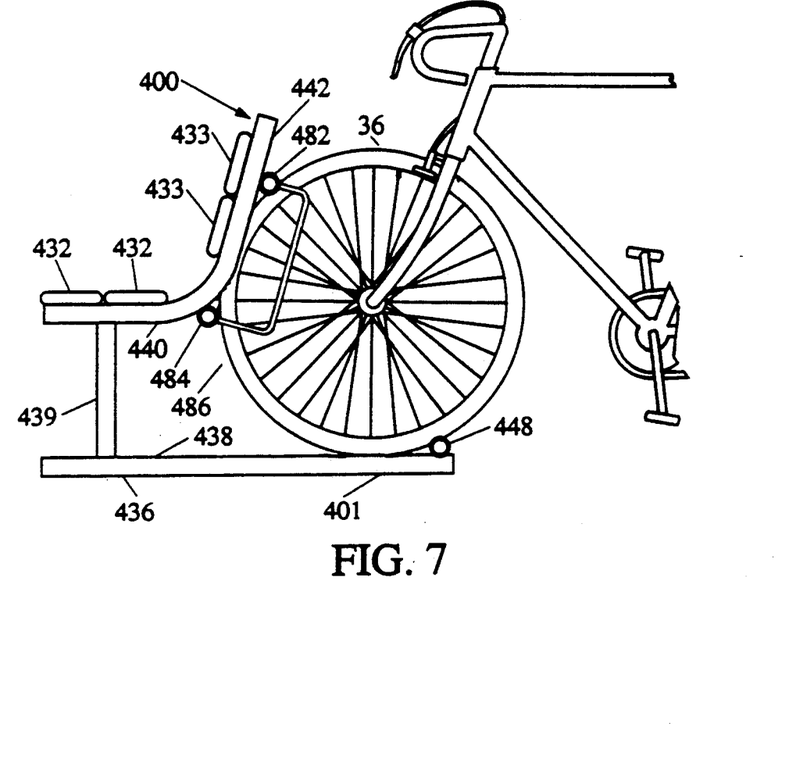
FIG. 7 is a side elevational view of a fourth embodiment of the bench stand of the present invention.
Figure 8:
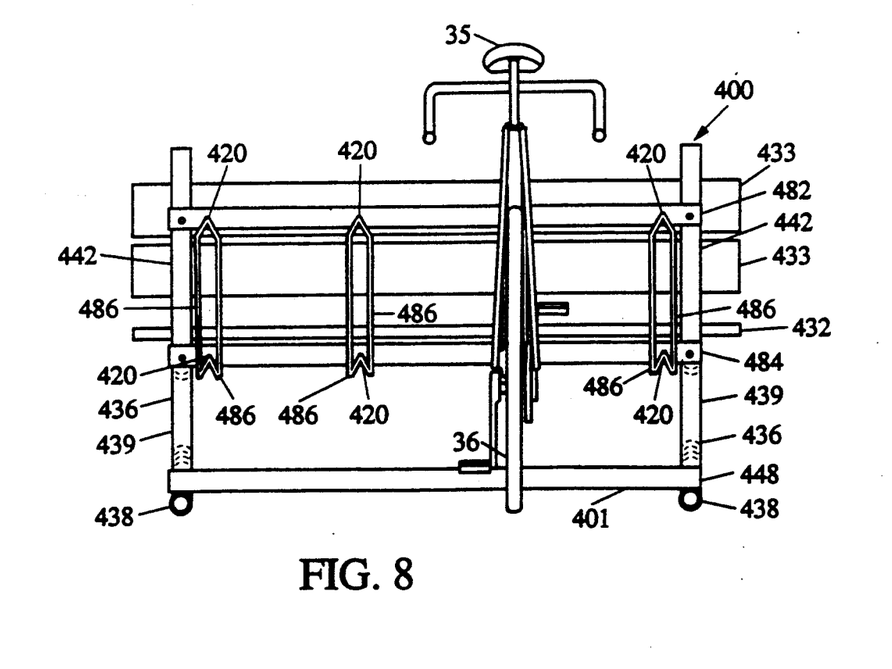
FIG. 8 is a rear elevational view of the bench stand of FIG. 7 showing a bicycle parked therein.

A fourth embodiment 400 of the bench stand of the present invention is shown in FIGS. 7 and 8. Parts corresponding to those of the third embodiment are indicated by like numbers incremented by 100. The bench stand 400 has a frame 401, having two frame members 436, a first horizontal upper rod 482, a second horizontal upper rod 484, a lower rod 448, and wheel positioning bicycle support members 486. The first upper rod 482 extends between and rigidly connects the back supports 442. The second upper rod 484 extends between and rigidly connects the frame members 436 and is spaced beneath the first upper rod 482. Wheel positioning members 486 which hold a wheel 36 of a parked bicycle 35 extend between the first upper rod 482 and the second upper rod 484 and are spaced to accept a bicycle wheel 36 to hold the bicycle 35 in an upright position. The bicycle wheel 36 is restrained from rearward travel by the lower rod 448 when the bicycle 35 is parked in an upright position. Each pair of wheel positioning members 486 is connected to a pair of V-shaped holders 420. The open parts of the Vs accommodate a bicycle wheel 36 and the pointed part of the first V of the pair is affixed to the first upper rod 482 and the pointed part of the second V of the pair is affixed to the second upper rod 484. The open parts of the Vs are joined by the wheel positioning members 486 which engage the bicycle wheel 36 and prevent its side-to-side travel.

Figure 9:
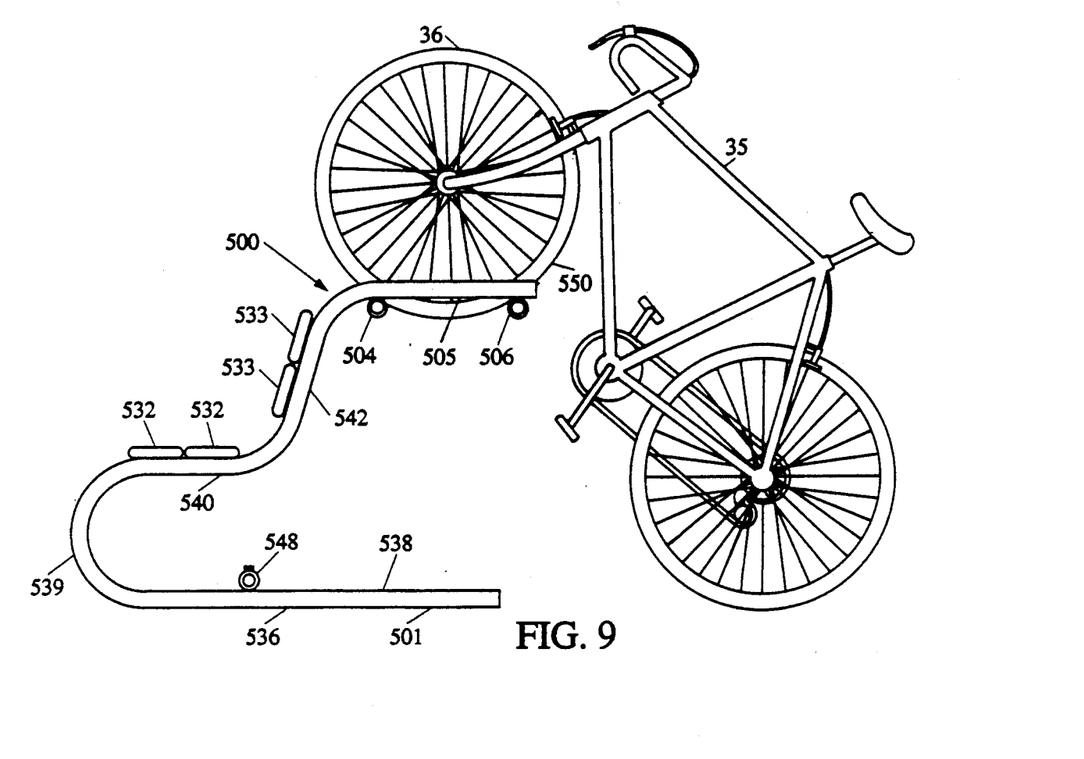
FIG. 9 is a side elevational view of a fifth embodiment of the bench stand of the present invention.
Figure 10:
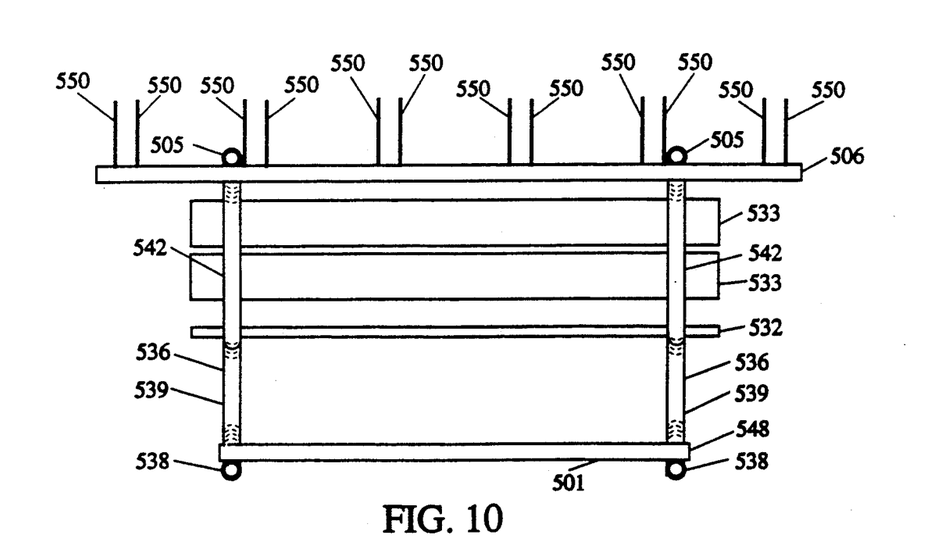
FIG. 10 is a rear elevational view of the bench stand of FIG. 9.

A fifth embodiment 500 of the bench stand of the present invention is shown in FIGS. 9 and 10. The bench stand 500 has a frame 501 having two frame members 536, a lower rod 548, a first upper horizontal rod 504, a second horizontal rod 506, and wheel positioning bicycle support members 550. The frame members 536 of the bench stand 500 have a base portion 538 which is horizontal and is in contact with the ground or floor. The base portion 538 is connected by a connecting portion 539 to a seat bearing portion 540 which is horizontally spaced from the base portion 538. A back support 542 extends upwardly and outwardly from the seat bearing portion. A holder portion 505 extends from the back support 542 and is horizontally spaced over and parallel to the base support portion 538. Planar members 532, 533 form seat and back supports.

A lower rod 548 extends between and rigidly connects the base support portions 538 of the frame members 536 and is spaced rearwardly from the connecting portion 539. A first upper horizontal rod 504 extends between and rigidly connects the holder portions 505 of the frame members 536 near the back supports 542. A second upper horizontal rod 506 extends between and rigidly connects the holder portions 505 of the frame members 536 and is spaced rearwardly of the first upper horizontal rod 504. Pairs of wheel positioning members 550 are affixed to and extend in a simple curve between the first upper horizontal rod 504 and the second upper horizontal rod 506 and are spaced to accept the bicycle wheel 36 therein to hold the bicycle 35 in an upright elevated position. When the bicycle 35 is placed above the holder portion 505 of the frame member 536, the bicycle wheel 36 is held between the first upper horizontal rod 504 and the second upper horizontal rod 506 and between a pair of wheel positioning members 550. The combination of members limits the motion of the bicycle 35. The wheel positioning members 550 restrain the bicycle 35 from tilting; the longitudinal motion of the bicycle wheel 36 is limited by the first upper horizontal rod 504 and the second upper horizontal rod 506. Thus the bicycle 35 may be placed in an upright position in the bench stand 500. Such a position is desirable when parking the bicycle 35 in a point-of-purchase display, such as at a sporting goods store. The bicycle 35 is elevated for dramatic appearance and ease of inspection by customers, while the bench stand 500 also provides convenient seating for customers.

Figure 11:
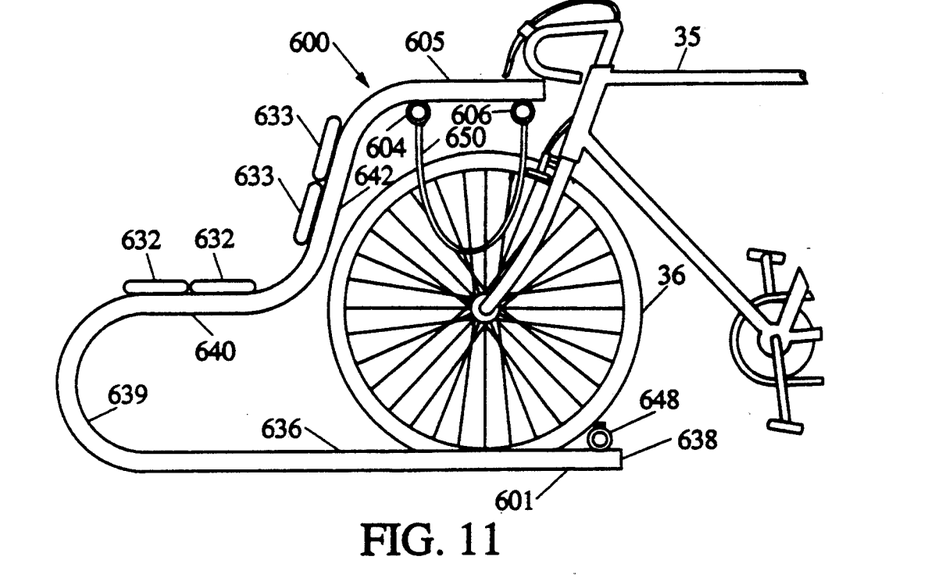
FIG. 11 is a side elevational view of a sixth embodiment of the bench stand of the present invention.
Figure 12:
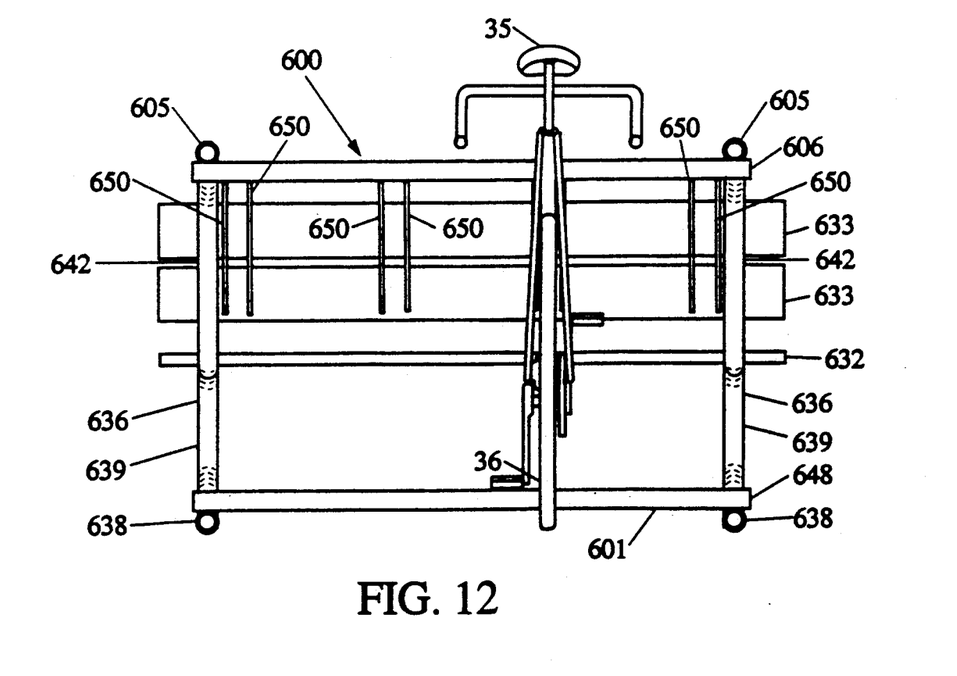
FIG. 12 is a rear elevational view of the bench stand of FIG. 11 showing a bicycle parked therein.

A sixth embodiment 600 of the bench stand of the present invention is shown in FIGS. 11 and 12, and parts corresponding to those of the bench stand 500 are given like numbers incremented by 100. The bench stand 600 has a frame 601, having two frame members 636, a lower rod 648, a first upper horizontal rod 604, a second upper horizontal rod 606 and wheel positioning bicycle support members 650. A lower rod 648 extends between and rigidly connects the rear extensions of base support portions 638 of the frame members 636 and is spaced rearwardly from the connecting portions 639. Two wheel positioning members 650 are connected below and extend in a simple curve between the first upper horizontal rod 604 and the second upper horizontal rod 606 and are spaced to accept the bicycle wheel 36 therein to hold the bicycle 35 in an upright position. When the bicycle 35 is parked between a pair of wheel positioning members 650, it is restrained from tilting. The longitudinal motion of the bicycle wheel is limited by the lower rod 648.

Figure 13:
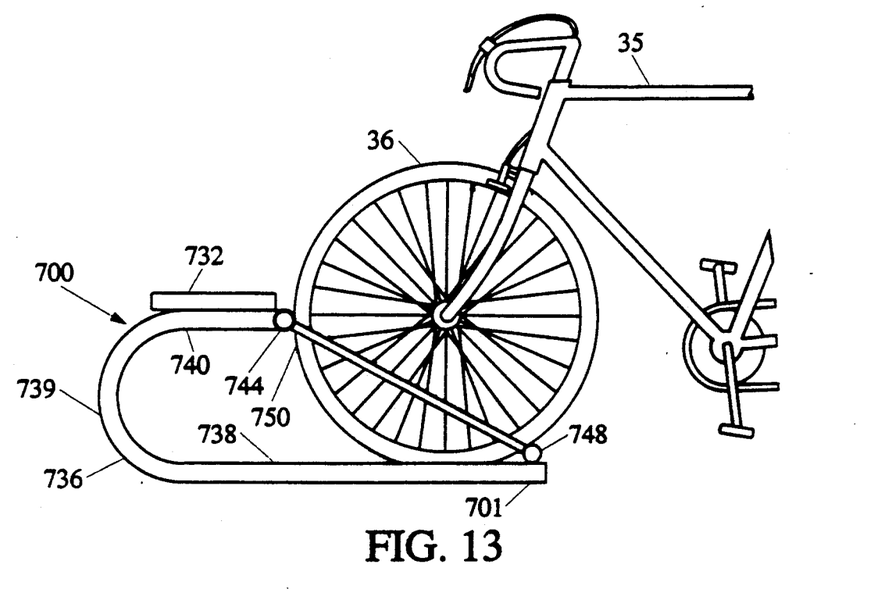
FIG. 13 is a side elevational view of a seventh embodiment of bench stand of the present invention with a bicycle in the parked position.
Figure 14:
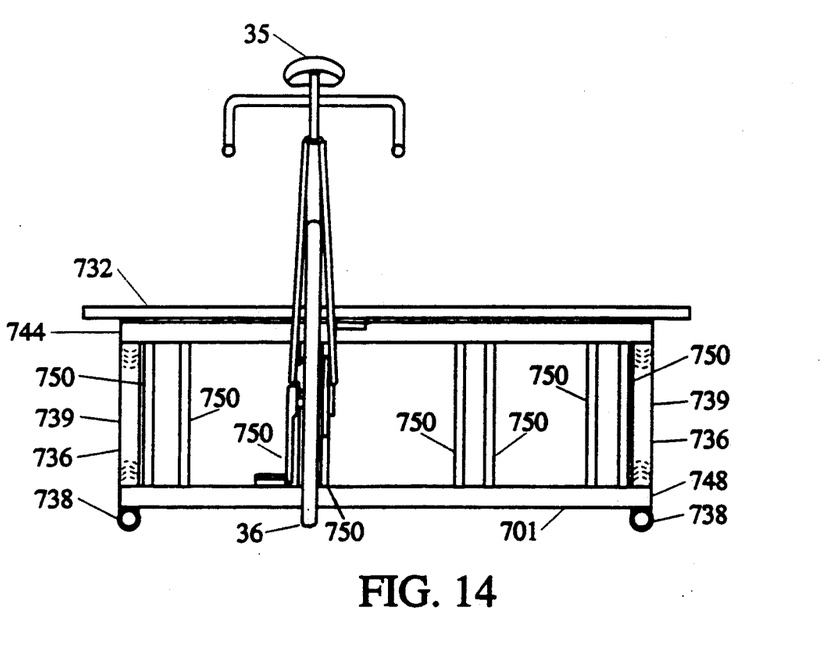
FIG. 14 is a rear elevational view of the bench stand of FIG. 13 showing a bicycle parked therein.

A seventh embodiment 700 of the bench stand of the present invention which provides seating but no back support is shown in FIGS. 13 and 14. The bench stand 700 has a frame 701 having frame members 736 which are horizontally spaced, an upper rod 744, a lower rod 748, and wheel positioning bicycle support members 750. Each frame member 736 has a base portion 738 with a curved connecting portion 739 which joins a seat bearing portion 740 which is horizontally spaced from the base portion 738. An upper rod 744 extends between and rigidly connects the rear of the seat bearing portions 740 of the frame. Planar seating members 732 extend between the seat bearing portions 740 to provide a seat. A lower rod 748 extends between and rigidly connects the rearward ends of the base portions 738. Pairs of wheel positioning members 750 extend between the upper rod 744 and the lower rod 748. A bicycle wheel 36 is accepted between these positioning members and held upright. The rearward travel of the wheel 36 is restricted by the lower rod 748.

Figure 15:
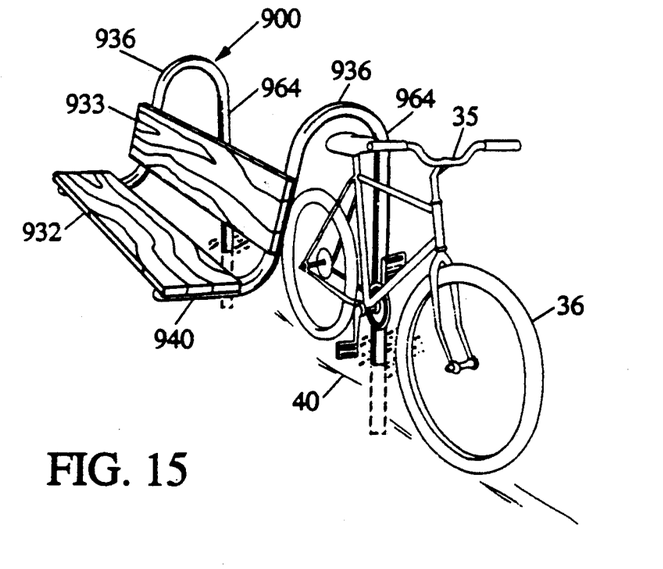
FIG. 15 is a perspective view of an eighth embodiment of the bench stand of the present invention with a bicycle parked under it.
Figure 16:
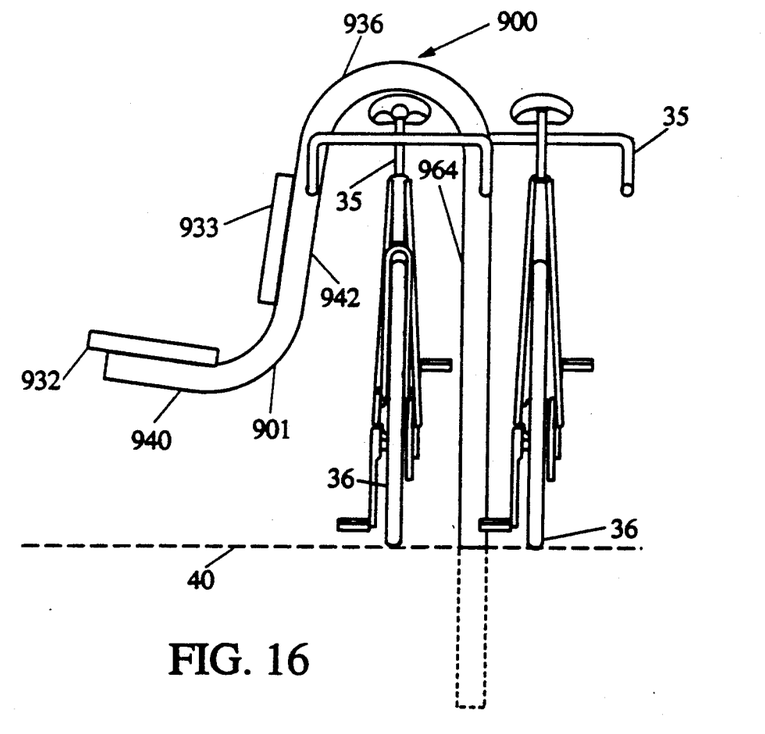
FIG. 16 is a side elevational view of the bench stand of FIG. 15 with two bicycles parked therein.

An eighth embodiment 900 of the bench stand of the present invention is shown in FIGS. 15 and 16. The bench stand 900 includes a frame 901 having two frame members 936 which are horizontally spaced. Each frame member 936 has a seat bearing portion 940 which is horizontal and is parallel to and spaced from the ground at a height and width to accommodate seating. A back support 942 extends upwardly from the horizontal seat bearing portion 940 and extends rearwardly at a height to accommodate a parked bicycle 35. A bicycle support portion 964 extends downwardly from the back support 942 and is horizontally spaced from the back support 942 so as to accept a parked bicycle 35 between the bicycle support portion 964 and the back support 942. The back support 942 acts as a second bicycle support and together with the bicycle support member 964 defines an unobstructed pathway for receiving at least one wheel of a bicycle and supporting the bicycle in an upright position. The bicycle support member 964 is engaged with the ground by being cast in the pavement or by being otherwise anchored into the ground. Planar members 932 are affixed to the seat bearing portions 940 and planar members 933 are affixed to the back supports 942 of the frame members 936. The bench stand 900 will accept four bicycles 35, two parked at each end and attached to each bicycle support portion 936.

Figure 17:
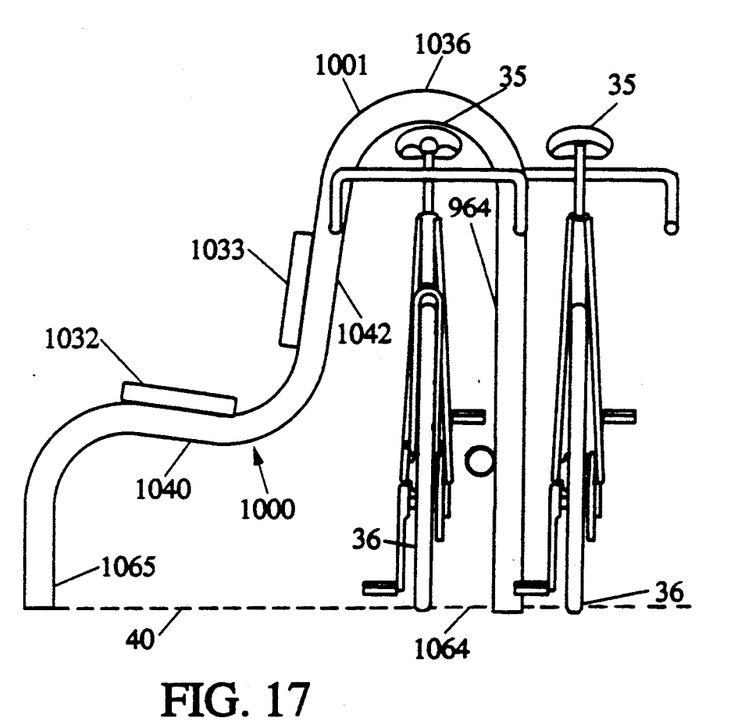
FIG. 17 is a side elevational view of a ninth embodiment of the bench stand of the present invention with bicycles parked therein.

A ninth embodiment 1000 of the bench stand of the present invention is shown in FIG. 17. Parts corresponding to those of the embodiment 900 at FIGS. 15 and 16 are given like numbers incremented by 100. The bench stand 1000, like the bench stand 900, has a frame 1001 having two frame members 1036 with seat bearing portions 1040, back supports 1042, bicycle support portions 1064 extending downwardly from the back support 1042, and seat and back support planks 1032, 1033. The bench stand 1000 also has vertical base portions 1065 which extend downwardly from the seat bearing portions 1040 of the frame members 1036. The bicycle support portions 1064 and the vertical base portions 1065 permit the bench stand 1000 to be rested on the ground or to be engaged within the ground. The bench stand 1000 will accept four bicycles, two parked at each end and attached to each bicycle support portion 1064.

Figure 18:
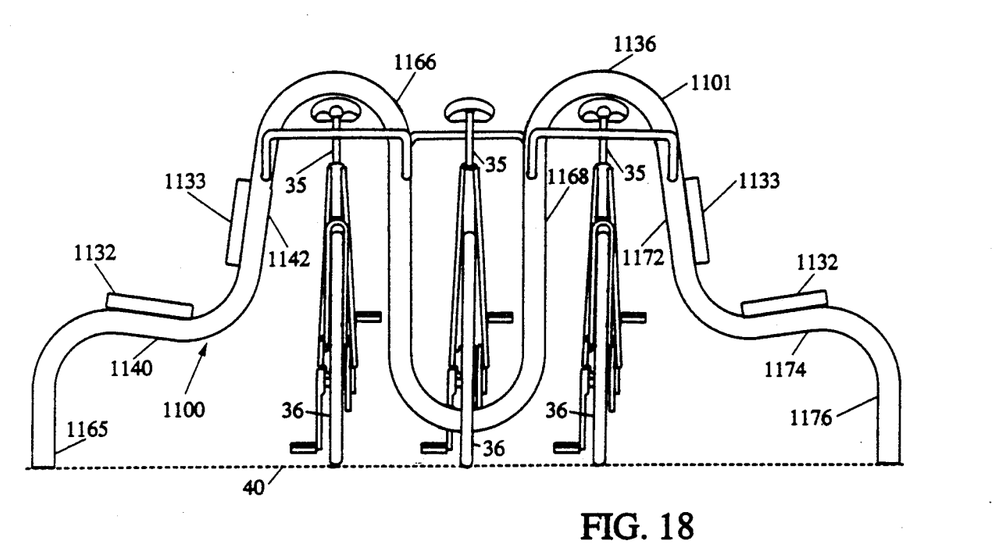
FIG. 18 is a side elevational view of a tenth embodiment of the bench stand of the present invention with bicycles parked therein.

A tenth embodiment 1100 of the bench stand of the present invention which will support up to six bicycles 35 and will provide two bench seating areas is shown in FIG. 18. The bench stand 1100 has a frame 1101 having two frame members 1136 which are horizontally spaced. Each frame member 1136 has a first vertical base portion 1165, a first seat bearing portion 1140, and a first back support 1142 similar to the elements of the bench stand 1000. A first bicycle support member 1166 which is downwardly depending extends from the first back portion at a height to accommodate a parked bicycle under it. A second bicycle support member 1168 which is upwardly extending and extends from the first bicycle support member 1166 to a height such that it can accommodate a bicycle 35 in a parked position. A second back support 1172 extends downwardly from the upwardly extending portion 1168. A second seat bearing portion 1174 extends downwardly from the second back portion 1172. A second vertical base portion 1176 extends downwardly from the second seat bearing portion 1174. The first vertical base portion 1165 and the second vertical base portion 1176 may be engaged in the ground or supported on the ground. The first back support 1142 and the first bicycle support member 1166 define a space for receiving bicycles, the two bicycle support members 1166, 1168 define a second space, and the second bicycle support member 1168 and the second back support 1172 define a third space.

Planar seat members 1132 are fastened to the first pairs of seat bearing portions 1140 and to the pairs of second seat bearing portions 1174. Planar back members 1133 are fastened to the pairs of first back supports 1142 and to the pairs of second back supports 1172.

The bench stand 1100 could be fabricated with a greater number of connected vertical bicycle support members to accommodate as many bicycles as desired.

Figure 19:
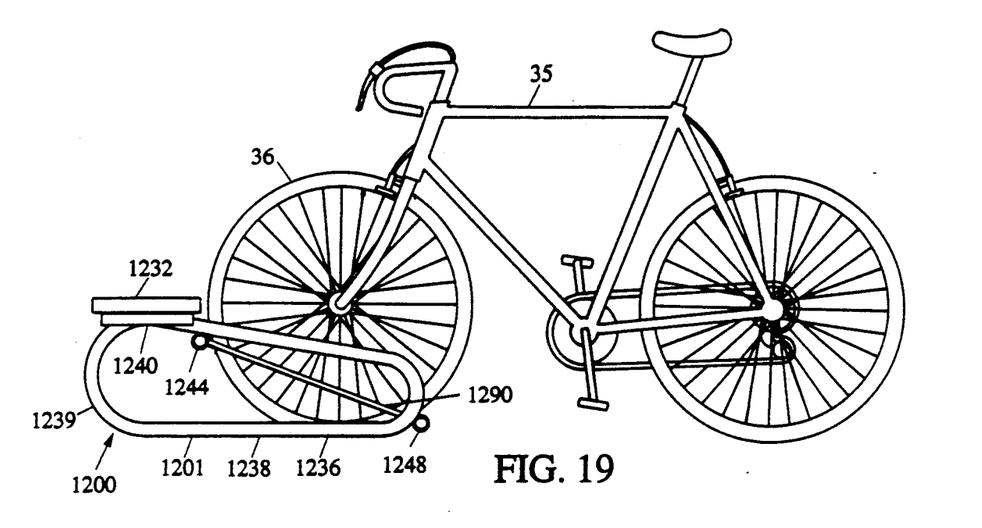
FIG. 19 is a side elevational view of an eleventh embodiment of the bench stand of the present invention with a bicycle parked therein.
Figure 20:
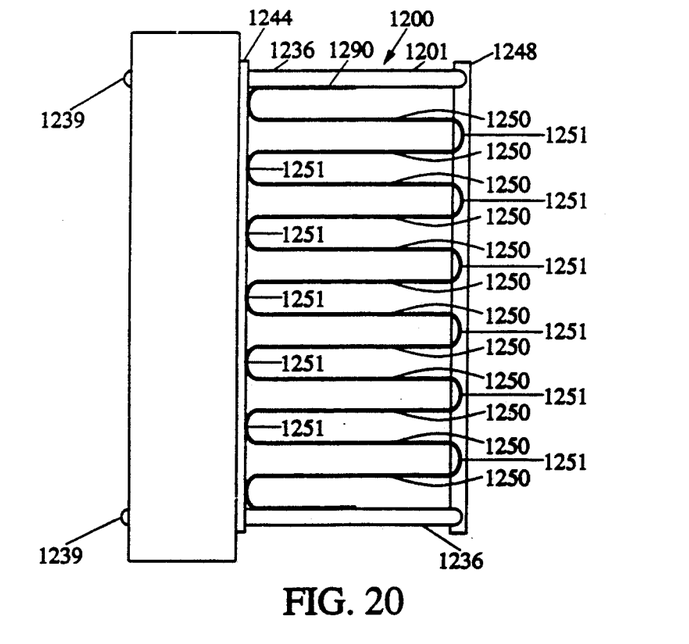
FIG. 20 is a top plan view of the bench stand of FIG. 19.

An eleventh embodiment 1200 of the bench stand of the present invention is shown in FIGS. 19 and 20. Parts corresponding to those of the embodiment 700 in FIGS. 13-14 are given like numbers incremented by 500. The bench stand 1200 includes a frame 1201 having two frame members 1236 which are horizontally spaced, a lower rod 1248, an upper rod 1244 and bicycle support members 1290. The frame members 1236 are bent into a configuration such that the lower bent portion provides a base portion 1238 which is horizontal and which is in contact with the ground or floor. The front of the base portion 1238 curves into a connecting portion 1239 and extends over the base portion 1238 to form a seat bearing portion 1240 which is at a height such that it accommodates seating. The rear of the seat bearing Portion 1240 curves downwardly to join the base 1238. A lower rod 1248 extends between and rigidly connects the rear of the base support portions of the frame members 1236. A sinuous member 1290 has two ends and a plurality of wheel positioning bicycle support members 1250. Each wheel positioning member 1250 is joined by a curved member 1251 to other wheel positioning members 1250. A pair of wheel positioning members 1250 define a space for receiving a bicycle 35 and act to hold a bicycle upright.

A planar seat member 1232 is affixed to the seat bearing portion 1240 to provide a bench for seating.

The frame members and rods of the invention may be made from tubular metal or square tubing or angle iron or timber. The planar members used for support can be made from wood, plastic or metal.

While these bench stands are useful and desirable for outdoor use, they are also suitable for indoor use where bicycles are displayed for purchase, as in bicycle stores, sporting goods stores, department stores or at trade shows.

It is understood that the present invention is not confined to the particular construction and arrangement of parts herein illustrated and described, but embraces such modified forms thereof as come within the scope of the following claims.

I claim:

1. A combination bench and bicycle stand comprising:
   (a) a frame having at least one horizontally spaced frame member, each frame member being adapted for supporting engagement with the ground and having a generally horizontally extending seat bearing portion spaced from the ground. Means for supporting a bicycle comprising bicycle support members positioned rearwardly of the seat being portion which define a space for receiving a bicycle wheel and which will support a bicycle rearwardly of the seat bearing portion in an upright position;
   (b) at least one planar seat member connected rigidly to and supported by the seat bearing portion of each frame member, the seat member providing a bench for a person seated thereon;
   (c) a back support extending upwardly from each seat bearing portion of each frame member; and
   (d) a planar back member rigidly connected to each back support, the planar back member serving as a back rest for a person seated on the seat member and extending between the seat member and the bicycle support members to serve as a barrier between a seated person and a bicycle supported by the bicycle support members.

2. A combination bench and bicycle stand comprising:
   (a) two horizontally spaced frame members, each frame member having a horizontal base portion with a front and rear for positioning on the ground, a connecting portion extending upwardly from the front of the base portion, a generally horizontal seat bearing portion extending rearwardly from the connecting portion and vertically spaced from the base portion;
   (b) a lower rod located rearwardly of the connecting portions and extending between and rigidly connecting the horizontal base portions of the frame members;
   (c) an upper rod extending between and rigidly connecting the frame members and located rearwardly of the horizontal seat bearing portions and upwardly from the base portions of the frame members;
   (d) A planar seat member affixed between the seat bearing portions to provide a bench for supporting persons sitting thereon; and
   (e) at least one pair of wheel positioning members extending rearwardly of the seat bearing portions and connected to at least one of the rods, the wheel positioning members in the pair being spaced from one another to accept a bicycle wheel therebetween to hold the bicycle wheel in an upright position.

3. The combination bench and bicycle stand of claim 2 wherein the wheel positioning members are connected to and extend between the upper rod and the lower rod and the lower rod is spaced rearwardly of the upper rod.

4. The combination bench and bicycle stand of claim 2, further comprising:
   (a) a back support extending upwardly from the horizontal seat bearing portion of each frame member; and
   (b) a planar member connected between the back support portions to serve as a back rest.

5. The combination bench and bicycle stand of claim 4 wherein the wheel positioning members are connected between the upper and lower rods and the lower rod is spaced rearwardly of the upper rod.

6. The combination bench and bicycle stand of claim 4 further comprising a second lower rod extending between and rigidly connecting the horizontal base portions of each frame member and located rearwardly from the first lower rod and adapted to limit the rearward travel of a parked bicycle wheel and wherein the first lower rod is located directly below the upper rod and the wheel positioning members extend between the upper rod and the first lower rod.

7. The combination bench and bicycle stand of claim 4, further comprising a second horizontal upper rod extending between and rigidly connecting the back supports of the frame members spaced above the first upper rod; wherein the wheel positioning members extend between the first upper rod and the second upper rod.

8. The combination bench and bicycle stand of claim 4, further comprising:
(a) a holder portion extending horizontally rearwardly from the back support of each frame member and spaced parallel to the base support portions; and
(b) a second upper rod connected between the holder portions of the frame members, wherein the first upper rod is connected between the holder portions frontward of the second upper rod, and the bicycle positioning members extend between the first and second upper rods to hold the front wheel of a bicycle.

9. The combination bench and bicycle stand of claim 8 wherein the wheel positioning members extend below the holder portions.

10. The combination bench and bicycle stand of claim 8 wherein the wheel positioning members extend above the holder portions to hold the front wheel of a bicycle in an elevated position.

11. A combination bench and bicycle stand comprising:
at least one frame member, each frame member having a horizontal seat bearing portion which is generally horizontal and vertically spaced from the ground;
(b) a back support portion extending upwardly from the horizontal seat bearing portion and extending rearwardly at a height to accommodate a parked bicycle thereunder;
(c) means for supporting a bicycle comprising a bicycle support member extending downwardly from the back support portion and horizontally spaced from the upwardly extending portion of the back support portion so as to define a pathway for receiving at least one wheel of a bicycle between the back support portion and the bicycle support member portion which will support the bicycle in an upright position, said pathway being completely unobstructed from the rearwardly extending back support portion to the ground, the bicycle support member being adapted for supporting engagement with the ground;
(d) a planar member affixed to each seat bearing portion and each back support portion to serve as a seat and a back rest for pedestrians.

12. A combination bench and bicycle stand of claim 11 further comprising a portion extending downwardly from the seat bearing portion of the frame member and adapted for engagement with the ground.

13. A combination bench and bicycle stand comprising:
(a) two spaced frame members, each frame member having a first vertical base portion adapted for engagement with the ground;
(b) a first horizontal seat bearing portion extending horizontally from each first vertical base portion at a height and width adapted for seating and spaced from the ground;
(c) a first back support portion extending upwardly from each first horizontal seat bearing portion;
(d) a bicycle support member connected to each first back support portion and having portions spaced from the first back portion to define a space for parking a bicycle;
(e) a second bicycle support member connected to each first bicycle support member and having portions horizontally spaced from the first bicycle support member such that it can accommodate a bicycle in a parked position;
(f) a second back support portion connected to each second bicycle support member and extending downwardly therefrom;
(g) a second horizontal seat bearing portion which extends outwardly from each second back support portion at a height and width adapted for seating;
(h) a second vertical base support portion extending downwardly from each second horizontal seat bearing portion which is adapted for engagement with the ground; and
(i) planar member affixed between the seat bearing portions and the back support portions to serve as seats and back rests.

14. A kit for assembly with planar members into a combination bench and bicycle stand, comprising:
(a) two horizontally spaced frame members, each frame member having a horizontal base portion with a front and rear for positioning on the ground, a connecting portion extending upwardly from the front of the base portion, a horizontal seat bearing portion extending rearwardly from the connecting portion and parallel to and vertically spaced from the base portion, the seat bearing portions being adapted for attachment to planar members to serve as a seat;
(b) a lower rod adapted to be located rearwardly of the connecting portions and to extend between and rigidly connect the horizontal base portions of the frame members;
(c) an upper rod adapted to extend between and rigidly connect the frame members and to be located rearwardly of the horizontal seat bearing portions and upwardly from the base portions of the frame members; and
(d) at least one pair of wheel positioning members adapted for connection to at least one of the rods, the wheel positioning members in the pair being adapted to being spaced from one another to accept a bicycle wheel therebetween to hold a bicycle wheel in an upright position.

* * * * *